United States Patent Office 3,676,298
Patented July 11, 1972

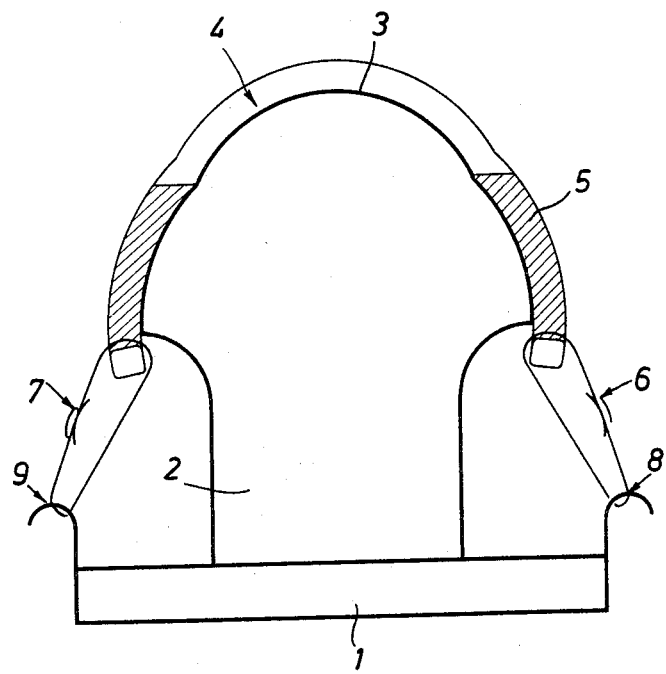

---

3,676,298
PROCESS FOR THE TREATMENT OF ORGANS TO BE USED AS GRAFTS, NOTABLY ANIMAL OR HUMAN CORNEAS
Madeleine Csanadi Moczar and Elemer Moczar, Gif-sur-Yvette, and Paul Bertrand Payrau, Paris, France, assignors to Etablissement Public: Agence Nationale de Valorisation de la Recherche (ANVAR), Courbevoie, France
Filed June 20, 1970, Ser. No. 42,748
Claims priority, application France, June 3, 1969, 6918127
Int. Cl. A61f 1/16, 9/00
U.S. Cl. 195—1.7
9 Claims

ABSTRACT OF THE DISCLOSURE

The invention relates to the treatment of corneas removed from human beings or animals and adapted to be subsequently grafted.

According to the process of the invention, products capable of establishing bridge-links between the protein molecules of the corneas are used to treat excised corneas to reduce the capacity of inflation of said corneas when they have been grafted while retaining their transparency. These products are notably dialdehydes.

The invention applies more particularly to transfixion grafts for the surgical treatment of fistula corneas, pterygium and especially chronic edema of the cornea.

---

The invention relates to the treatment of animal or human organs with a view to their future use, notably as grafts, and it relates more particularly, though not exclusively, to a process for the treatment of corneas, as this is the case in which its application appears to be the most useful.

It is known that corneal grafts for the treatment of ocular diseases are divided into two main types: lamellar grafts or transfixion grafts.

The first of these techniques consists in operating on a relatively thin layer of the cornea, retaining the endothelial membrane intact on the organ treated. It is known that the endothelium plays a fundamental role in the control of corneal hydration, which conditions the transparency of the cornea. This type of lamellar graft presupposes the existence of a functionally intact endothelial layer on the organ treated.

It is necessary to use the second technique when the endothelial layer of the organ treated is also affected, as is the case, for instance, in chronic edmea of the cornea. It consists in operating on the cornea and endothelium as a whole.

Processes for preserving corneas essentially for lamellar grafts are known in the prior art. These processes generally consist in maintaining corneas in a dried or frozen state after their removal. Such corneas can be used, as required as lamellar grafts when a normally functioning endothelial layer is present. Unfortunately, they cannot be used as transfixion grafts because, after a few days, they swell and become rapidly opaque. This swelling and opacity are due to the natural tendency of the cornea to absorb large amounts of water. This hydrophilia is compensated in a living eye by a mechanism which is active on the endothelium level, and which maintains the subhydration necessary to transparency. The use of such grafts is, therefore, excluded in the case of transfixion grafts.

U.S.S.R. Pat. No. 172,152 (G. P. Popov) can be cited as a prior art document which illustrates the desiccation method. In this known process for corneal preservation by desiccation, the eye is subjected to a preliminary treatment with a malachite green solution and an antibiotic physiological solution before the removal of the cornea. The cornea is also washed in an antibiotic physiologic solution and is then secured to a cylindrical support. Desiccation is effected by means of an aluminium gel.

Other known processes aim at maintaining the graft in survival by means of an isolated organ culture method. U.S.A. Pat. No. 3,371,012 for instance, describes a medium which ensures the necessary physiological conditions for cells to remain viable for several days. This medium is a solution containing a mucopolysaccharide acid. Similarly, French Pat. No. 1,472,970 relates to the preservation of corneal grafts by means of a liquid containing a mucopolysaccharide acid and vitamin C. However, the cornea is a living tissue whose preservation depends on the viability of the cells, and consequently cannot be preserved by these processes for longer than about seven days.

An object of the invention is a process for treating corneas with a view to their subsequent use as transfixion or lamellar grafts, a process which does not have the abovementioned drawbacks.

Broadly speaking, this process consists essentially in causing products capable of establishing bridge-links between the protein molecules of the cornea to act on the said cornea.

Other characteristics and advantages of the invention will be brought out from the description which follows and from the appended drawing.

The single drawing shows an example of an embodiment of a device for holding corneas treated according to the process of the invention during the desiccation step.

Examples of the embodiment of the process of the invention will be given hereinafter, it being understood that these examples are in no way limitative.

The process of treatment according to the invention can be applied to corneas surrounded with the sclera or in isolation, or corneas without the epithelium and endothelium (stroma).

According to the invention, dialdehydes which are capable of establishing bridge-links between the protein molecules of corneas are used to treat corneas.

It has notably been discovered that certain dialdehydes easily form bridge-links with the proteins of corneal stroma, with the result that their hydration capacity is decreased.

Corneas can be treated with $C_2$ to $C_6$ dialdehydes, and preferably with glyoxal and glutaraldehyde.

According to a first, preferred, embodiment of the invention, the corneas are immersed in an aqueous aldehyde solution having a concentration in the range of 0.5 to 20%. The time required for treatment may vary from 30 minutes to 2 hours in the case of glutaraldehyde and from 1 to 3 hours for glyoxal.

According to another mode of embodiment of the process of the invention, the corneas are exposed to vapors of dialdehydes for a period of time varying from about 12 to 60 hours.

It is also possible to use a dialdehyde wherein the two aldehyde groups are separated by 1 to 4 carbon atoms, it being possible to replace one of these atoms by an oxygen atom. The chain separating the carbonyls can be branched and substituted with one or more OH groups.

According to another preferred from of embodiment of the process of the invention, dialdehydes can be formed in situ by oxidizing the stroma carbohydrates with the salts of a periodic acid. The corneas are soaked in a buffered or unbuffered solution of $NaIO_4$, for instance, at a temperature in the range of from 4 to 25° C. and in the dark. The treatment can last from 1 to 24 hours.

The sodium periodate is destroyed by a glycol solution at a concentration of 0.1 to 2%. The glucide chains of the stroma chains are thus converted into polyaldehydes by cleavage of the bonds

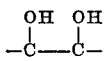

In the embodiments given hereinabove, the excess reagent is eliminated by washing the cornea in distilled water after the cornea has been treated with the dialdehyde or periodate. The cornea is desiccated on a silica gel or on calcium chloride at room temperature and for a period of about two days. Intensive desiccation should be avoided as it may destroy the histologic structure of the cornea.

It should be noted that the desiccation process is an essential element in the formation of bridge-links. For this reason, it is preferable to preseve the corneas so treated in the dry, rather than in the frozen state.

The desiccation step is preferably carried out by maintaining the cornea in its natural shape by means of a suitable device. The appended figure shows an example of an embodiment of such a device. It comprises a base onto which is secured a piece of revolution 2, the upper portion 3 of which has the shape and size of an eye. 4 represents the cornea surrounded with its sclera 5 stretched over the form 3 by means of suture threads such as 6 and 7. These threads are attached to fixing hooks such as 8 and 9 rigidly secured to base 1.

When corneas are used, they are subjected to preliminary washing for several hours in a physiological salt solution to remove traces of the reagent.

Some examples of the treatment of corneas according to the process of the invention, and the results obtained, will be given hereinbelow.

EXAMPLE 1

The corneal epithelium is removed from human eyeballs within 24 hours after death. The cornea is then incised and removed, 8 to 10 mm. of the sclera being retained. It is cleaned with a scarificator and rinsed in physiological salt solution. It is then soaked in 30 ml. of a 3% glyoxal solution for 1 hour at 4° C., with occasional stirring. The cornea with its surrounding sclera is then washed several times in physiological salt solution, with decantation each time. It is then placed on the device shown in the figure to be desiccated for 48 hours by means of a dehydrated silica gel at 120° C.

Corneas so treated are then soaked several times in physiological salt solution for one hour, with decantation each time, they are then dried in a desiccator by means of dehydrated silica, but without placing them on the device of the figure.

The corneas can then be preserved for several months.

The corneas are then rehydrated when they are required for use. Their maximum level of rehydration is from 0.7 to 0.8 of the normal physiological level. These corneas are perfectly transparent.

Substantially similar results are obtained by replacing the glyoxal used in this example with glutaraldehyde.

EXAMPLE 2

Excised pig corneas are immersed for 5 hours in a 1% aqueous solution of $NaIO_4$ in darkness and at a temperature of 4° C. The corneas are then rinsed in water and soaked for 2 hours in a 0.2% aqueous glycol solution. The corneas are then washed and desiccated according to the process given in Example 1. The hydration level of corneas so treated is from 0.6 to 0.7 of the normal physiological hydration level.

EXAMPLE 3

Moist pig corneas are exposed to glyoxal vapour in equilibrium with a 30% solution of this aldehyde for 48 hrs. in darkness and at a temperature of about 20° C.

These corneas are then desiccated according to the process described in Example 1. The hydration level of these corneas is from 0.6 to 0.8 that of the normal physiological level.

It is seen that the process of the invention enables corneas to be obtained which are useable as transfixion grafts despite the absence of a living endothelium. The grafts obtained by this process have a hydration level compatible with transparence.

The invention can be applied to the surgical treatment of fistula corneas, pterygium and especially chronic edemas of the cornea.

What we claim is:

1. A process for treating corneas to prevent their swelling and losing their transparency for future use as grafts comprising establishing bridge-links between the protein molecules of the constituent substances of said corneas and dialdehydes by (1) placing said corneas in intimate contact with a bridge linking reagent selected from the group consisting of a dialdehyde having 2 to 6 carbon atoms in the form of an aqueous solution containing 0.5–20% of said dialdehyde, a vapor or formed in situ with a 1% aqueous solution of $NaIO_4$ without effecting the transparency of the cornea; (2) washing the corneas to remove the excess reagent from the corneas; and (3) partially desiccating the corneas to facilitate the formation of said bridge links without destroying the histologic structure of the cornea.

2. The process of claim 1, in which said corneas are desiccated on a drying agent selected from the group consisting of silica gel and calcium chloride.

3. A process according to claim 1 wherein said corneas are exposed to a dialdehyde vapor reagent for a period of 12 to 60 hours.

4. A process according to claim 1 wherein the two aldehyde groups in said dialdehyde are separated by 1 to 4 carbon atoms.

5. A process according to claim 1 wherein said dialdehydes are formed in situ on the corneas by the oxydation of the carbohydrates of the stroma by soaking in a 1% $NaIO_4$ solution at a temperature of 4–25° C., in the dark for 1 to 24 hours.

6. The process of claim 1 in which the dialdehyde is in the form of a 0.5 to 20% aqueous solution.

7. A process according to claim 6 wherein said treatment is carried out for a period of time of from 0.5 to 48 hours at a temperature in the range of 0 to 37° C.

8. The process of claim 7 in which said dialdehyde is glutaraldehyde and said contact time is 30 minutes to 2 hours.

9. The process of claim 7 in which said dialdehyde is glyoxal, and said contact time is 1–3 hours.

References Cited

UNITED STATES PATENTS 3,057,775  10/1962  Rendon _____ 424—333

FOREIGN PATENTS 1,063,330  1/1960  Germany _____ 195—1.7

OTHER REFERENCES

Yanoff et al., Amer. J. of Clin. Path., vol. 44, pp. 161–171, August 1965.

RICHARD L. HUFF, Primary Examiner

U.S. Cl. X.R.

424—333

PO-1050
(5/69)

UNITED STATES PATENT OFFICE
CERTIFICATE OF CORRECTION

Patent No. 3,676,298          Dated July 11, 1972

Inventor(s) Moczar et al

It is certified that error appears in the above-identified patent and that said Letters Patent are hereby corrected as shown below:

Page 1, Column 1, the filing date should read

--Filed June 2, 1970, Ser. No. 42,748--.

Signed and sealed this 12th day of December 1972.

(SEAL)
Attest:

EDWARD M. FLETCHER, JR.
Attesting Officer

ROBERT GOTTSCHALK
Commissioner of Patents